(12) United States Patent
Ayuba et al.

(10) Patent No.: US 12,675,307 B2
(45) Date of Patent: Jul. 7, 2026

(54) SIMULATION OF USER ACTIONS IN COMPUTER ENVIRONMENT

(71) Applicant: INTERNATIONAL BUSINESS MACHINES CORPORATION, Armonk, NY (US)

(72) Inventors: Sho Ayuba, Tokyo (JP); Mayumi Goto, Ayase-city (JP); Yoshio Horiuchi, Hiratsuka (JP); Timothy Waileong Koh, Chuo-ku (JP)

(73) Assignee: International Business Machines Corporation, Armonk, NY (US)

( * ) Notice: Subject to any disclaimer, the term of this patent is extended or adjusted under 35 U.S.C. 154(b) by 714 days.

(21) Appl. No.: 17/700,908

(22) Filed: Mar. 22, 2022

(65) Prior Publication Data

US 2023/0315499 A1     Oct. 5, 2023

(51) Int. Cl.
*G06F 9/455* (2018.01)
*G06F 8/658* (2018.01)
*G06F 11/1446* (2026.01)
*G06F 11/362* (2025.01)

(52) U.S. Cl.
CPC .............. *G06F 9/455* (2013.01); *G06F 8/658* (2018.02); *G06F 11/1458* (2013.01); *G06F 11/3632* (2013.01)

(58) Field of Classification Search
None
See application file for complete search history.

(56) References Cited

U.S. PATENT DOCUMENTS

| | | | |
|---|---|---|---|
| 7,941,470 B2 * | 5/2011 | Le ........................... | G06F 3/0674 709/224 |
| 8,527,896 B2 | 9/2013 | Matthews et al. | |
| 9,417,895 B2 * | 8/2016 | Safari ..................... | H04L 67/51 |
| 9,672,355 B2 | 6/2017 | Titonis et al. | |
| 10,726,119 B2 * | 7/2020 | Feroz ...................... | G06F 21/53 |
| 10,776,152 B2 * | 9/2020 | Nachum ............... | G06F 9/4843 |
| 10,860,540 B1 * | 12/2020 | Ugur-Ozekinci ... | G06F 11/1461 |
| 11,086,741 B2 | 8/2021 | Zhang et al. | |
| 11,288,642 B1 * | 3/2022 | Hawes ............... | G06Q 20/0855 |
| 11,657,038 B1 * | 5/2023 | Attaluri ............... | G06F 11/1464 707/676 |

(Continued)

FOREIGN PATENT DOCUMENTS

| | | |
|---|---|---|
| JP | 2014142745 A | 8/2014 |
| JP | 2018538616 A | 12/2018 |
| JP | 2018538634 A | 12/2018 |

OTHER PUBLICATIONS

"Method for the creation of interactive software simulators," IP.Com, An IP.com Prior Art Database Technical Disclosure, IP.com No. IPCOM000200108D, IP.com Electronic Publication Date: Sep. 28, 2010, 3 pages.

*Primary Examiner* — William L Bashore
*Assistant Examiner* — Koorosh Nehchiri
(74) *Attorney, Agent, or Firm* — CHIP LAW GROUP

(57)     ABSTRACT

A launch of a user application is detected and a clone instance of that user application is initiated. A trigger is detected. The trigger is within the user application and is for a simulation of a user action. The user action is executed in the clone instance in response to detecting the trigger. The results of the user action are displayed to a user of the user application.

20 Claims, 2 Drawing Sheets

(56) References Cited

U.S. PATENT DOCUMENTS

| | | | |
|---|---|---|---|
| 2004/0261026 A1* | 12/2004 | Corson | G06F 9/45512 |
| | | | 700/88 |
| 2009/0113109 A1* | 4/2009 | Nelson | G06F 11/2046 |
| | | | 718/1 |
| 2010/0174593 A1* | 7/2010 | Cao | G06Q 30/0271 |
| | | | 705/14.12 |
| 2012/0284639 A1* | 11/2012 | Yuniardi | G06Q 10/00 |
| | | | 715/752 |
| 2017/0230329 A1* | 8/2017 | Akef | H04L 61/5076 |
| 2018/0284986 A1* | 10/2018 | Bhagi | G06F 11/1464 |
| 2020/0042222 A1* | 2/2020 | Ramaswamy | G06F 3/0619 |
| 2020/0175152 A1 | 6/2020 | Xu et al. | |
| 2020/0349019 A1* | 11/2020 | Dawkins | G06F 16/172 |
| 2021/0034439 A1* | 2/2021 | Vaishnav | G06F 11/3664 |
| 2022/0292295 A1* | 9/2022 | Hastings | G06T 7/70 |

* cited by examiner

SIMULATION OF USER ACTIONS IN COMPUTER ENVIRONMENT

BACKGROUND

The present invention relates to software simulation, and more specifically, to simulating user actions in an application.

Software applications include some operations that are performed automatically and some operations that are performed based on a user command or action. The operations available in an application sometimes changes when the version of that application updates. Some applications provide the ability for a user to undo operations that are performed based on user command. However, some applications do not provide that ability, and some applications do not provide it for every function.

SUMMARY

Some embodiments of the present disclosure can be illustrated as a method that comprises detecting a launch of a user application. The method also comprises initiating a clone instance of the user application. The method also comprises detecting a trigger for a simulation of a user action. The trigger is detected in the user application. The method also comprises executing the user action in the clone instance in response to detecting the trigger. The method also comprises displaying the results of the user action to a user of the user application.

Some embodiments of the present disclosure can also be illustrated as a system that comprises a processor and a memory in communication with that processor. The memory contains program instructions that, when executed by the processor, are configured to cause the processor to perform the above-summarized method.

Some embodiments of the present disclosure can also be illustrated as a computer program product that comprises a computer readable storage medium. The computer readable storage medium comprises program instructions embodied therewith that are executable by a computer to cause the computer to perform the actions in the above-summarized method.

DETAILED DESCRIPTION

Figure 1:
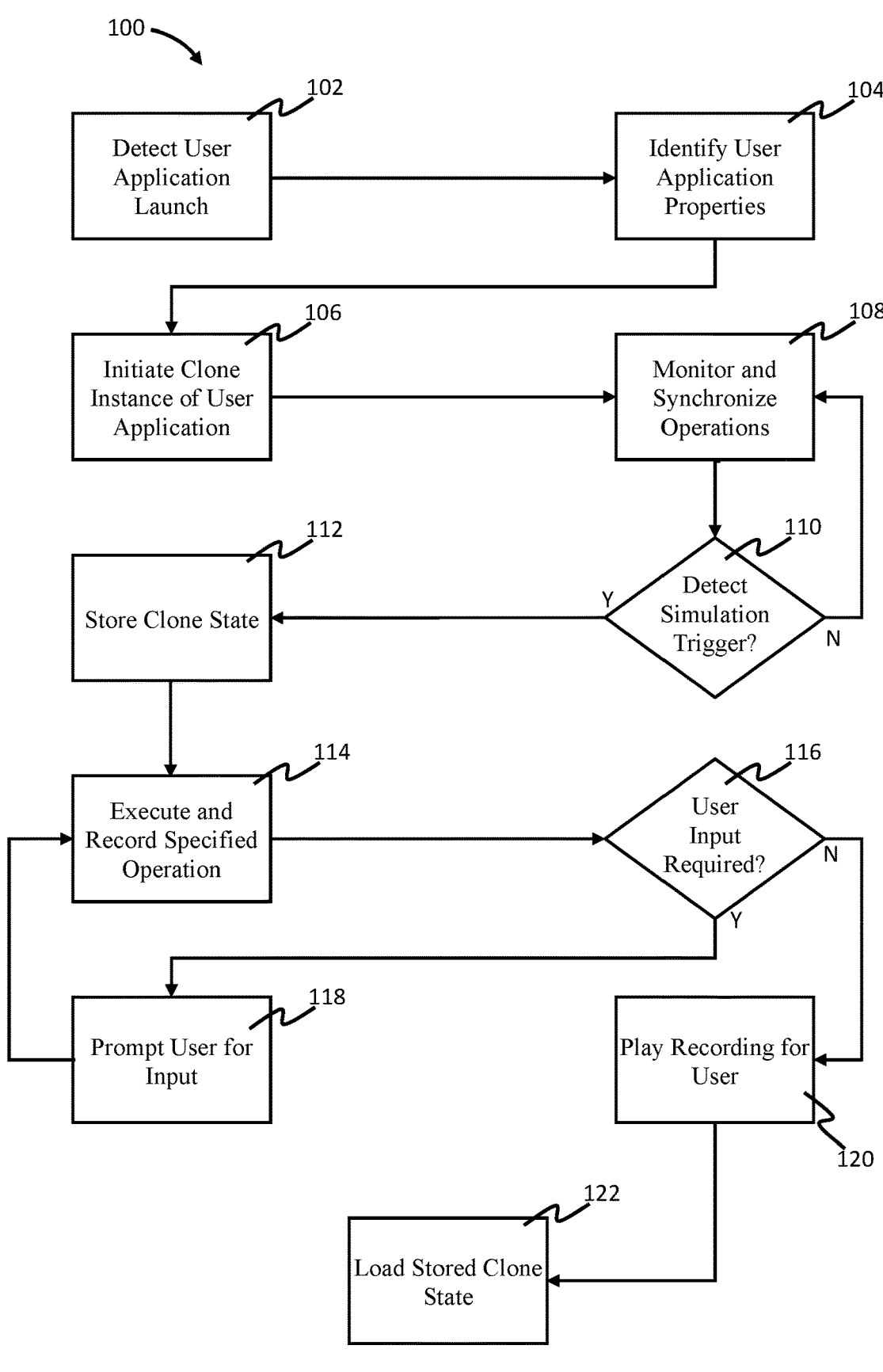
FIG. 1 depicts an example method of operating a clone instance of a user application, in accordance with embodiments of the present disclosure.

A user application, as referred to herein, refers to a software application that is utilized by a user of a computer system. These applications often are user interactive and allow a user to control the operations performed by them. Typically, a user is able to exercise this control by entering a user command.

A user command may take several forms. A common form of user command includes a user selecting a description of an operation from a list of possible operations. The operations in the list may be labeled with words, a symbol, or both. For example, a "save file" operation may be labeled with the words "Save as" and a symbol of a floppy disk. To command a computer system to perform the "save file" operation, a user may select the words "Save as" (for example, with a mouse cursor) in a drop-down menu and click on the words.

Some users of computer systems are experienced in using software, and thus are able to predict what a particular operation is likely to do. For example, an experienced user of a computer system may understand immediately what an "Extract to" operation would perform on a condensed file.

However, some users of computer systems are not sufficiently experienced to predict what some operations are likely to do. Further, some operations of some applications cannot be undone by those applications once the user commands the system to perform the operations. This issue can lead to users mistakenly commanding a system to perform unintended operations. In some instances, users may be aware of both their inexperience and the potential inability to undo operations once those operations are performed. This awareness may cause the users to be unwilling to experiment with unknown operations, even when those operations may be extremely useful to the users.

This problem may be exacerbated by several factors. Some user applications, for example, do not provide sufficient labels for an inexperienced user to understand the operations of the application. Some user applications also provide meager, if any, documentation (e.g., software manuals, how-to videos) that explain each operation that may be performed as a result of a user command. Further, even when an operation is explained in documentation, it may only be explained generally, and thus the operation's effects in a user's circumstances may still be unclear. Further, some software applications are updated regularly. When a software application is updated, some operations may be added to the application, some operations may be deleted, and some may be changed. Further, even when an operation is completely unchanged by software versions, the label/description of an operation may change, making some users uncertain regarding what the operations would perform.

Finally, some operations that may perform identical, or very similar, functions may be described very differently (e.g., labeled with different language or symbols) by different software applications, in different operating systems, or when using different hardware. Similarly, some operations that may perform different functions may be described very similarly or even identically (e.g., labeled with the same language or symbols).

For all these reasons, inexperienced users of software applications may be frequently confused regarding the operations of user applications. In some instances, this may cause those users to avoid using those user applications, or to use those user applications in a very limited, inefficient fashion. In some instances, this may also cause some users to make mistakes by selecting operations that the users did not intend to select. The effects of these mistakes may range from mildly annoying to extremely costly, both in a financial sense (e.g., performing a software function that leads to lost business), a computer-efficiency sense (e.g., performing a software function that reduces computer performance), and a personal sense (e.g., performing a software function that exposes sensitive personal data or causes termination of employment).

To address some of the above issues, some embodiments of the present disclosure provide a simulation system that maintains a cloned instance of a user application while the user application is operating. This simulation system may be, for example, a virtual machine that operated independently of the user application or may be a partition of the user application.

In some embodiments, the simulation system may detect when a user application is launched and initiate a clone of that user application in the simulation system. The clone of the user application may be created based on available data that pertains to the user application, such as configuration files that are called by the user application upon being launched. Though this process, the simulation system may also identify a resource with which the user application is configured to interact. For example, the simulation system may detect that the user application can affect functions of the operating system on which the user application runs (for example, through the operating system's API). The simulation system may also detect that the user application is configured to pull data from or push data to another application that runs on the same computer system. The simulation system may also detect that the user application is configured to send data to or request data from a different computer system, such as a remote storage server. In these examples, the simulation system may, as part of initiating the clone instance of the user application, also initiate a simulation of those identified resources.

In some embodiments, the simulation system may initiate the cloned instance, as well as any other resources, in a simulation environment. This simulation environment may be functionally separated from the other applications on the computer system and the resources to which that computer system has access. In this way, the simulation environment may operate as a demo environment or test sandbox, such that the operations performed in the simulation environment do not have any actual effects outside the simulation environment.

In some embodiments, the simulation system may monitor the operations performed by the user application and synchronize the cloned instance with the user application. For example, the simulation environment may access an operation system's API and detect the processes being performed by the user application. In other examples, the simulation environment may transmit the processes being performed by the user application to the simulation system. The simulations system may then perform the same processes in the clone instance, and thus the state of the clone instance at any given time may be the same as the state of the user application.

In some embodiments, the simulation system may also monitor the user application for the presence of an operation-simulation trigger (also referred to herein as a "simulation trigger" or simply a "trigger"). An operation-simulation trigger may be an indication to the simulation system that a user of the user application would like to see a simulation of the results of a user command. For example, a trigger may take the form of a user's cursor hovering over a user command in a context menu (e.g., an "expand all" command in an "Edit" menu) for at least a threshold period of time. A trigger may also take the form of a user hitting a particular key or key combination.

Upon detecting a simulation trigger, the simulation system may perform the function or functions specified by the trigger (e.g., the "expand all" function from the previous example) in the clone instance. Because the user application and the clone instance are ideally synchronized at this point, the results of performing those functions in the clone instance may be the same as performing those functions in the user application. Thus, the simulation system may also record the results of the results of that function or those functions, which can then be displayed to the user in the user application (for example, in a new window that is overlayed on top of the user application). By reviewing those results, the user could learn the purpose of the operations specified by the command and determine whether to perform the command in the user application.

In some embodiments, the simulation system may also store the state of the clone instance when a simulation trigger is detected. This may be useful for rolling the clone instance back to that state after the functions are performed within the clone instance. For example, an operation that deletes application data may be simulated in a clone instance. The results of deleting that data would then be displayed to the user of the user application. If the user decides to not perform that operation in the user application after viewing those results, the simulation system could then load the previous state of the clone instance at the time of the trigger. This may, in effect, undo the deletion of the application data in the clone instance, bringing the clone instance back into synchrony with the user application.

In some embodiments, the simulation system may record the progress of the clone instance as well as the results of the operation. For example, a simulation system may record a short movie (e.g., a GIF file) of the user command being selected, the operation being performed, and the result of the operation. This short movie could then be displayed to the user of the user application, increasing the user's ability to understand the consequences of the command.

FIG. 1 depicts an example method 100 of operating a clone instance of a user application, in accordance with embodiments of the present disclosure. Method 100 may be performed by a simulation system that takes the form of, or operates as part of, a computer system, such as computer system 201. In some embodiments, this simulation system may be part of a user application or may operate independently of the user application. In some embodiments, the computer system may be the same computer system on which the user application is run. For example, the user application and simulation system may both be running on the same desktop computer. However, in other embodiments the simulation system may run on a separate computer system. For example, the simulation system may run on a simulation server (e.g., a cloud server) and the user application may run on a workstation or mobile device.

Method 100 begins in block 102, in which a simulation system detects the launch of a user application. In some embodiments, block 102 may involve detecting a specific user application. For example, the simulation system may be configured to simulate only a single user application or a list of select user applications. In this example, detecting the launch of the user application would detect the launch of that single user application or an application from that list. However, in some embodiments, the simulation system may be configured to simulate every user application on a monitored computer system, and thus any user application that is launched on the monitored computer system may cause the simulation system to detect the launch of a user application in block 102.

Upon detecting the launch of a user application in block 102, the simulation system identifies properties of the user application in block 104. The properties identified may depend on the situation, but typically block 104 includes identifying the properties necessary to start a clone that would function, from the user's perspective, in the same way that the actual user application functions. Block 104 may include, for example, loading the configuration files that are called by the operating system on which the user application is run when the user application is launched. Those configuration files could be used by the simulation system to initiate a clone of the user application on the simulation system. In some embodiments, a complete copy of the user application, including all data that the user application is configured to access, may be transferred to the simulation system.

Once the user application properties are identified in block 104, a clone instance of the user application is initiated by the simulation system in block 106. The nature of this clone instance and the method by which the clone instance is initiated may vary. For example, in some embodiments the simulation system may operate a simulation environment (e.g., a virtual machine) that includes a clone instance of the operating system of the user application. In these embodiments, initiating a clone instance may include installing a clone of the user application on the clone operating system. In other embodiments, the simulation system may operate a sandbox environment that does not contain a separate instance of the operating system but may coordinate with the operating system that is running the user application. This coordination may enable the simulation system and the operating system to treat the clone instance a standard application running alongside the user application, but the simulation system and operating system may duplicate the startup processes during the launch of the user application in the sandbox environment, effectively cloning the user application. In some embodiments, the simulation system may analyze the configuration files and startup settings for the user application. This may enable the simulation system to mirror any custom configurations and settings of the user application in the clone instance.

Of note, some embodiments of the present application may operate multiple clone instances simultaneously. This may be useful for several reasons. For example, some users may desire to simulate the results of a user command while a previous user command is already being simulated. This may be likely, for example, in instances in which the operations executed by a command take a long time to simulate. In these instances, the user may desire to simulate other commands while waiting for the previous user command to finish. In these instances, simulating multiple clone instances of the same application may be necessary. Similarly, some users may desire to simulate commands from multiple user applications at the same time. In these instances, simulating a clone instance of a first user application may be performed simultaneously with simulating a clone instance of a second user application.

As noted above, some embodiments of the present disclosure may include simulating resources with which the user application is configured to interact. The nature of these resources may depend upon the embodiment and the use case. For example, in addition to initiating a clone instance of the user application in a sandbox environment, some embodiments of the present disclosure may also simulate other applications running on the operating system with which the user application is configured to interact. These applications may include, for example, software for querying a database or for processing data. A resource may also include a database itself, a data file, a hardware peripheral, and an external storage unit.

Once the user application is launched and the clone instance is initiated, the simulation system may monitor, in block 108, the operations of the user application and keep the clone instance synchronized with those monitored operations. The nature of this monitoring may vary in different embodiments.

For example, in some embodiments of the present disclosure, the simulation system may have operating-system permissions to observe each process performed by the user application. The simulation system may, in these embodiments, command the clone instance to perform each of those processes it detects. In some embodiments, either the user application or the operating system may transmit each process that is performed by the user application to the simulation system. In some embodiments, the simulation system may not actually observe (or receive from the user application or operating system) the actual processes that are performed by the user application but may instead observe (or receive) a state of the user application. An updated state may be observed by the simulation system (e.g., queried of the operating system) or received by the simulation system (e.g., transmitted from the user application) after designated events or in a periodic pattern. For example, the user application may be configured to transmit an updated state of the user application after each process is completed by the user application. The simulation system may also be configured to query the user application for an updated state every 30 seconds.

The nature of the synchronization performed by the simulation system may also vary between different embodiments. For example, in embodiments in which the user application transmits each process performed by the user application as the user application is performing that process, the simulation system may actually perform those processes in the clone instance as well. In embodiments in which the simulation system is not aware of each individual process performed by the user application, but receives updated states of the user application, the simulation system may calculate the fastest method to alter the state of the clone instance to match the updated state of the user application. This may include, for example, moving or deleting data throughout the simulation system or copying analysis results from the user application to the clone instance.

In some embodiments, monitoring and synchronizing operations between the user application and the clone instance in block 108 may involve simply creating a new clone instance of the user application periodically or whenever the state of the user application changes. In this instance, the previous clone instance may be deleted or stored for rollback purposes.

As part of monitoring the user application, the simulation system determines, in block 110, whether a user has activated a simulation trigger. A simulation trigger, also referred to herein as an operation-simulation trigger, or simply "trigger," refers to an indication that a user may desire explanation of a command the user could enter into the user application, or of the operations/functions that would result from entering that command. The form of a simulation trigger may depend on the embodiment. A trigger may take the form of a user pausing for a threshold period of time (e.g., a trigger threshold) after highlighting a command or moving a cursor over a command. A trigger may also take the form of a user selecting an option to simulate an operation, such as with a key bind (e.g., a keyboard key combination) or context-menu option. In some embodiments, a trigger may be detected by prompting a user with an option to view a simulation of an operation if a user is selecting a command that the user has not previously selected or if the user is selecting a command that cannot be undone.

For example, a user may be able to select, in a circuitry-simulation user application, a command to calculate the worst negative slack may cause the user application to simulate one or more signals propagating through a micro-processor design. In this example, the user may be uncertain what design macros command may cause to be simulate, or how long the process may take when started. Thus, the user may highlight the command in a drop-down application menu (e.g., a "simulation tools" menu) or a context menu (e.g., a menu that is activated by clicking the right mouse button on the application) but pause before activating the command. In this example, the simulation system may detect that the user has paused his/her cursor over the command for a threshold period of time and conclude that the user would like a demonstration of that operation. Thus, in this example, a period of user inactivity before entering a command in the user application may be a simulation trigger.

In another example, a user may be using a graphic-design application and may be unsure of what the "flatten layers" command would perform. In this example, the user hit a particular key bind to request a simulation of the command. For example, the user could enter a pre-designated "simu-lation request" series of keyboard inputs, which may cause the simulation system to simulate the next command that the user selects in the user application. Thus, in this example, a key bind may be a simulation trigger.

In another example, a user may select, in a file-processing user application, a command to delete a file. If the user application would be unable to recover this file once it is deleted, it may alert the user of that fact and offer to perform the simulation for the user before performing the deletion operation. Thus, in this example, a user selecting a prompt for an operation simulation may be a simulation trigger.

In some embodiments, a trigger may be initially detected by the user application itself, which may then alert the simulation system that the trigger occurred. In other embodi-ments, the trigger may be detected by the operating system on which the user application is running, which may alert the simulation system. In some embodiments, however, the trigger may be initially detected by the simulation system itself. For example, the simulation system may monitor the inputs provided to the user application and the outputs provided by the user application through a heightened permission layer.

If no simulation trigger is detected in block 110, the simulation system returns to block 108 and continues to monitor the user application. However, if a trigger is detected, the simulation system proceeds to store the current state of the clone in block 112. This clone state may be used after simulation of an operation in the clone instance. Specifically, because the clone state stored in block 112 should be a copy of the user application at the time at which the simulation trigger was detected in block 110, the clone state could be used to bring the clone instance back to synchrony with the user application after the simulated operations were performed on the clone instance.

The nature of storing the clone state may vary based on the embodiment. For example, in some embodiments storing a clone state may resemble backup snapshot technology, in which a copy of the clone is periodically created and stored. After each copy is created, the changes that were made to the clone after that copy may be recorded, so the current clone state may be expressed as the most-recent copy with the recorded changes made to that copy. In this example, block 112 may include ensuring that the changes that were made to the clone since the last copy was created are recorded.

In some embodiments, storing the state of the clone of the user application may involve recording the status of various processes being performed by the clone, as well as important data accessed by the clone. In this way, the simulation system may be able to recreate the clone from the state information, if needed.

In some embodiments, storing a state of the clone in block 112 may involve creating a complete copy of the clone. This complete copy would, in essence, be a second clone of the user application at the time at which the simulation trigger was detected.

Once a clone state is created in block 112, the simulation system begins, in block 114, to execute the operation (or operations) specified by the simulation trigger. For example, the simulation trigger detected in block 110 may inform the simulation system that a user of the user application is requesting a simulation of the "calculate worst negative slack" command. In this example, the operations involved in fulfilling this command would be the specified operations. Thus, in this example, block 114 may involve loading a netlist of a microprocessor design and simulating signals moving through the logic of the design.

In some embodiments, the simulation system may be unable to perform one or more operations specified by a simulation trigger. For example, the operations may require restricted data or permissions not accessible by the user. Thus, in some embodiments the simulation system may attempt to confirm, in block 114, whether the simulation system is able to perform the specified operations. If the simulation system determines that the operations cannot be performed in the cloud instance, the simulation system may request input from the user on how to proceed. The details of this request are provided in the discussion of blocks 116 and 118.

In some embodiments, the nature of recording the executed specified operations may depend upon the use case. In general, the purpose of the recording is to develop a presentation that can be shown (e.g., played back) to the user of the user application to provide the user with an understanding of what the specified operation would do from a user perspective. However, the preferred nature of creating and presenting this recording may vary based on the use case. For example, if the simulation system has sufficient storage, a recording of the clone instance graphic user interface (including any available status windows) may be made by periodically (e.g., 24 times per second, 60 times per second) taking an image of the clone instance graphic user interface (also referred to herein as a "GUI") and any sounds that are played by the clone instance during execution. These images and sounds may then be packaged together as a movie file (e.g., an MPEG). If, on the other hand, the simulation system is somewhat storage constrained, less data may be stored during the execution. For example, sounds that are played by the clone instance may not be stored as part of the movie file (e.g., a GIF). Similarly, fewer images of the clone-instance GUI may be stored per second (e.g., 10 per second). Further, in particularly storage-con-strained scenarios, the simulation system may record the processes and results thereof performed by the specified operations, rather than images of the operations. In these scenarios, the recording of the operations may take the form of a text file of a list of processes and the result for each process.

The nature of the recording may also be affected by the properties of the user for whom the simulation recording is being created. For example, if the user application is typi-cally used by non-sophisticated users, the simulation system may be more likely to record a full movie (e.g., an MPEG file) of the operation to provide as much detail to the non-sophisticated user as possible. However, if the user application is typically used by very sophisticated users, the simulation system may be more likely to create a list of processes and the results thereof. In some embodiments, sophisticated users may also be able to view the events and processes that would occur in resources utilized by the user-application (e.g., operating-system events, API calls, data sent by a storage unit) while the operations were executed by the user application. In these embodiments, the simulation system may utilize a listener process with permissions to monitor the other resources that are simulated by the simulation system.

In some embodiments, block 114 may include notifying a user that the simulation is occurring. This may prevent a user from taking a risk and selecting the command that results in the specified operations. This may also cause the user to expect the recording of the specified operations.

As part of beginning, in block 114, to execute and record the specified operations in the clone instance, the simulation system may also determine, in block 116, whether any user input would be required to complete the specified operations. For example, if the specified operations require a user password, block 116 may include the simulation system detecting that the user must be prompted for the user password. As a second example, a set of operations that simulate a microprocessor design may require user input to specify the frequency at which the microprocessor should be simulated.

In some embodiments, the simulation may determine, in block 116, that user input may be required because heightened permissions are required to perform one or more specified operations. In this example, the required user input may take the form of an instruction. For example, in some instances the user may inform the simulation system to simulate the operations anyway, redacting information where necessary, even though the user would be unable to perform those operations in the user application. In some instance, however, the user may not have permissions to even view a simulation of the operations, in which case the user input may specify whether the user would like to see the error message that would result if the user attempted to perform the operations in the user application.

In a similar example, the simulation system may determine, in block 116, that restricted data is necessary in order to simulate the specified operations. In this example, the user input that is required may take the form of fabricated data that is entered by the user for the purposes of performing the specified operations, even though the real data that would be required by the user application is unavailable.

If the simulation system determines, in block 116, that user input is required to execute one or more specified operations, the simulation system prompts the user for that input in block 118. This prompt may take the form of a window that is displayed over the user application and that contains a data-entry field or ability to select from multiple pre-designated options.

Once the user provides the prompted input, the simulation system returns to block 114 to execute and record the specified operations. This iteration of block 114 may resemble or be identical to the last iteration of block 114. Of note, this may include determining whether the next specified operation can be performed, and whether any further user input is required in block 116. For this reason, a simulation system may loop through blocks 114, 116, 118, and 114 again until no further user input is required to perform the specified operations.

If the simulation system determines, in block 116, that no user input is required, the simulation system proceeds to play the recording of the operations in the clone instance for the user in block 120. In some embodiments, this recording may be played, for example, in a window that is overlayed over the user application. In these embodiments, the simulation system may maintain the sole copy of the recording. However, in some embodiments, the simulation system may transmit the recording to the user application, and thus the recording may be played in the user application.

In some embodiments, a simulation system may not proceed to block 120 until all specified operations have been performed and completed in the cloud instance. For example, the simulation system may wait until all specified operations are completely finished before the recording is finalized and played for the user. However, in some situations that may result in the user waiting a significant amount of time for the simulation to be displayed. For example, specified operations involve complex simulation of a microprocessor design, the specified operations may take several hours to be performed in the clone instance. Thus, in some embodiments the simulation system may start to play the recording for the user in block 120 before the specified operations have been completed in the clone instance. In these embodiments, the recording may be continuously updated as the cloud instance makes further progress completing the specified operations. In some embodiments, this may take the form of streaming a long recording to the user as the recording is being created. In other embodiments, this may take the form of playing partial recordings of the total specified operations (e.g., a first partial recording of operations 1-2 out of 10, a second partial recording of operations 3-4 out of 10, and so on) as those recordings are available.

In some embodiments, the user may have some controls over the recording playback. For example, a user may be able to pause or rewind a recording to enable to user to more thoroughly study the operations performed at block 114. The user may also be able to speed up or slow down the playback speed as well. Speeding up a recording may be useful if an execution resulted in a particularly long recording (e.g., an operation with an hour of processing time). Slowing down a recording may be useful for very short recordings or in situations in which many operations happen in a very short amount of time. In some embodiments, the simulation system may allow the user to replay the recording after it is played in block 120. This may be useful in instance in which the operations are very complicated or if the user is particularly inexperienced with the operations. Further, in some embodiments, the simulation system may provide the opportunity for the user to save the recording for later viewing.

After the recording is played for the user in block 120, the simulation system may proceed to load, in block 122, the clone state that was stored in block 112. This may be useful, for example, if the user decides to not perform the specified operations in the user application. In this example, loading the clone state that was stored in block 112 could cause the clone instance to be back in synchrony with the user application. Thus, in some embodiments, the simulation system may only perform block 122 if the user does not perform the specified operations (e.g., does not select the command associated with the simulation trigger). In some embodiments, the simulation system or user application may prompt the user to decide whether to perform the specified operations after the recording is played in block 120. If the user does decide to perform the specified operation in the user application, the simulated action will also be performed in the main (i.e., non-simulated) environment. Thus, the main environment will, at that point, be synchronized with the clone instance in which the specified operations were simulated, not the stored clone state. Thus, in these situations, block 122 may be skipped.

Loading the stored clone state in block 122 may vary based on the nature of the stored clone state. As discussed in connection with block 112, a clone state could take the form of a most-recent copy of the clone instance and a list of changes that have occurred to the clone instance since that copy was created. In this example, loading the stored clone state may include replacing the current clone instance with the most-recent copy, then performing the changes from the list of changes on the most-recent copy. Similarly, in some embodiments the clone state that was stored in block 112 may be a complete copy of the cloned instance at the time at which the simulation trigger was detected. In these embodiments, loading the stored clone state may include deleting the prior clone instance (i.e., the instance in which the specified operations were executed) and switching to the copy of the cloned instance.

The simulation system may end method 100 after loading the stored clone state in block 122. In some embodiments, however, the simulation system may return to block 108 after loading the stored clone state. In this way, the simulation system may continue to monitor the operations performed in the user application and synchronize the clone instance with the user application based on the results of those monitored operations. This may create a loop between blocks 108 through 122 that continues until method 100 is terminated (e.g., by a user request to cease monitoring the user application, when the user application is terminated, or others).

Figure 2:
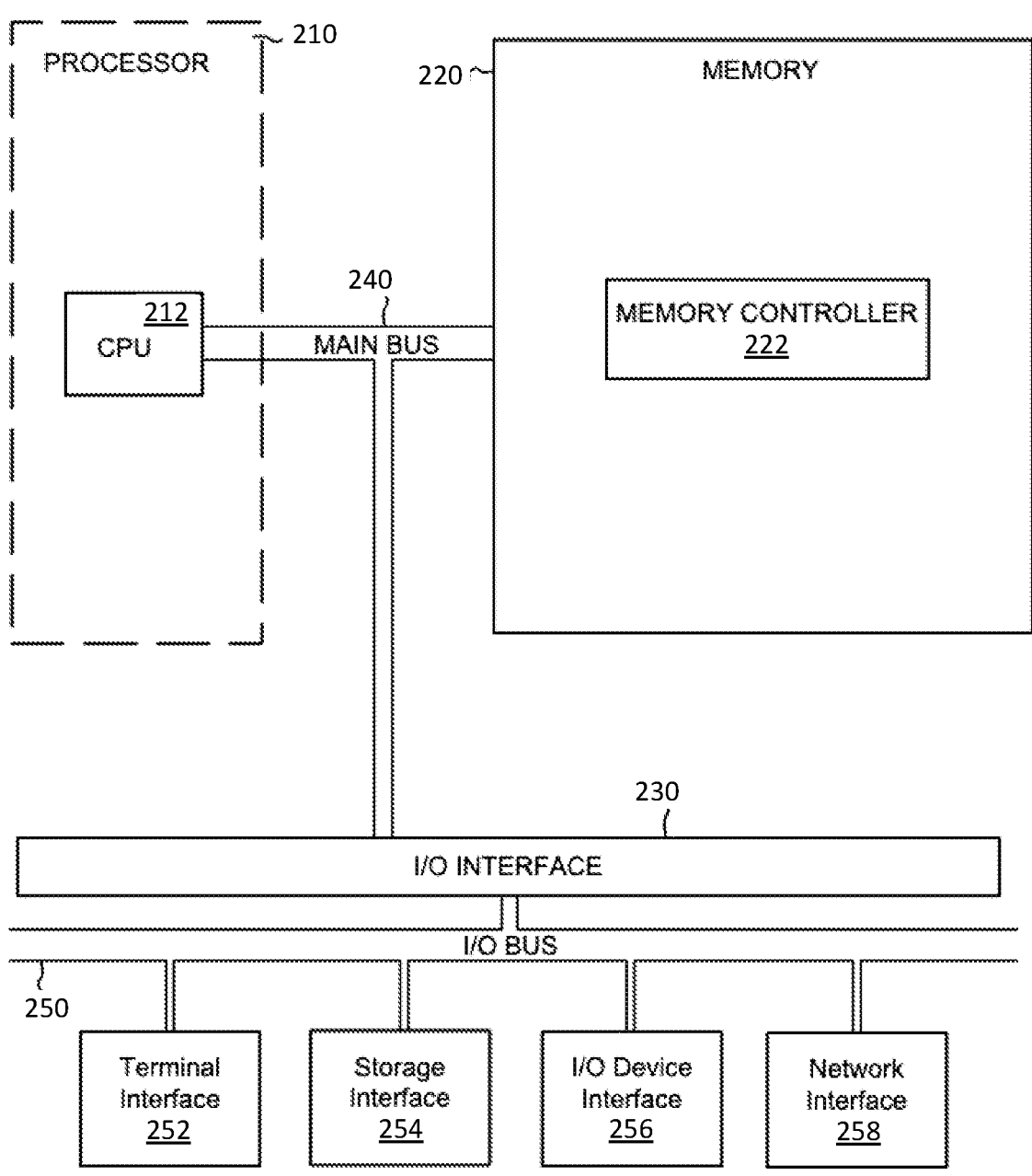
FIG. 2 depicts the representative major components of an example computer system that may be used in accordance with embodiments of the present disclosure.

FIG. 2 depicts the representative major components of an example Computer System 201 that may be used in accordance with embodiments of the present disclosure. For example, Computer System 201 may take the form of a computer (e.g., a desktop workstation) on which both a user application and a simulation system are running. Computer System 201 may also take the form of a computer (e.g., a remote server, such as a cloud computing resource) on which a simulation system is running and that is separate from a computer that is running a user application.

The particular components depicted are presented for the purpose of example only and are not necessarily the only such variations. The Computer System 201 may include a Processor 210, Memory 220, an Input/Output Interface (also referred to herein as I/O or I/O Interface) 230, and a Main Bus 240. The Main Bus 240 may provide communication pathways for the other components of the Computer System 201. In some embodiments, the Main Bus 240 may connect to other components such as a specialized digital signal processor (not depicted).

The Processor 210 of the Computer System 201 may include one or more CPUs 212. The Processor 210 may additionally include one or more memory buffers or caches (not depicted) that provide temporary storage of instructions and data for the CPU 212. The CPU 212 may perform instructions on input provided from the caches or from the Memory 220 and output the result to caches or the Memory 220. The CPU 212 may include one or more circuits configured to perform one or more methods consistent with embodiments of the present disclosure. In some embodiments, the Computer System 201 may contain multiple Processors 210 typical of a relatively large system. In other embodiments, however, the Computer System 201 may contain a single processor with a singular CPU 212.

The Memory 220 of the Computer System 201 may include a Memory Controller 222 and one or more memory modules for temporarily or permanently storing data (not depicted). In some embodiments, the Memory 220 may include a random-access semiconductor memory, storage device, or storage medium (either volatile or non-volatile) for storing data and programs. The Memory Controller 222 may communicate with the Processor 210, facilitating storage and retrieval of information in the memory modules. The Memory Controller 222 may communicate with the I/O Interface 230, facilitating storage and retrieval of input or output in the memory modules. In some embodiments, the memory modules may be dual in-line memory modules.

The I/O Interface 230 may include an I/O Bus 250, a Terminal Interface 252, a Storage Interface 254, an I/O Device Interface 256, and a Network Interface 258. The I/O Interface 230 may connect the Main Bus 240 to the I/O Bus 250. The I/O Interface 230 may direct instructions and data from the Processor 210 and Memory 220 to the various interfaces of the I/O Bus 250. The I/O Interface 230 may also direct instructions and data from the various interfaces of the I/O Bus 250 to the Processor 210 and Memory 220. The various interfaces may include the Terminal Interface 252, the Storage Interface 254, the I/O Device Interface 256, and the Network Interface 258. In some embodiments, the various interfaces may include a subset of the aforementioned interfaces (e.g., an embedded computer system in an industrial application may not include the Terminal Interface 252 and the Storage Interface 254).

Logic modules throughout the Computer System 201— including but not limited to the Memory 220, the Processor 210, and the I/O Interface 230—may communicate failures and changes to one or more components to a hypervisor or operating system (not depicted). The hypervisor or the operating system may allocate the various resources available in the Computer System 201 and track the location of data in Memory 220 and of processes assigned to various CPUs 212. In embodiments that combine or rearrange elements, aspects of the logic modules' capabilities may be combined or redistributed. These variations would be apparent to one skilled in the art.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
   detecting a launch of a first user interactive application;
   initiating, based on the detecting of the launch of the first user interactive application, a first clone instance of the first user interactive application;
   detecting, after the initiating of the first clone instance of the first user interactive application, a trigger in the first user interactive application for a simulation of a user action, wherein the detecting of the trigger is based on hovering of a cursor, for a threshold period of time, on a symbol associated with the user action in the first user interactive application;
   executing, in the first clone instance of the first user interactive application, the same user action for which the trigger is detected in the first user interactive application, wherein a result of the execution of the user action in the first clone instance is same as a result of executing of the user action in the first user interactive application; and

controlling display of the result of the execution of the user action to a user of the first user interactive application.

2. The computer-implemented method of claim 1, wherein the initiating of the first clone instance comprises:
identifying a property of the first user interactive application; and
creating the first clone instance based on the identified property.

3. The computer-implemented method of claim 1, further comprising:
monitoring operations of the first user interactive application; and
synchronizing, based on the monitoring of the operations, the first clone instance and the first user interactive application.

4. The computer-implemented method of claim 1, further comprising:
recording the execution of the same user action in the first clone instance, wherein the display of the result comprises display of the recording.

5. The computer-implemented method of claim 4, further comprising:
determining available storage of a simulation system; and
recording, based on the determined available storage, the executing of the same user action in the first clone instance, wherein
the recording comprises capturing images of the execution of the same user action in the first clone instance or creating a text file of a list of processes and a respective result of the execution of the same user action in the first clone instance.

6. The computer-implemented method of claim 1, further comprising:
determining that a user input is required for the executing of the same user action; and
prompting, based on the determining that the user input is required, the user to provide the user input.

7. The computer-implemented method of claim 1, further comprising:
storing, based on the detecting of the trigger, a state of the first clone instance; and
loading, after the executing of the same user action, the stored state of the first clone instance.

8. The computer-implemented method of claim 7, wherein
the storing comprises initiating a second clone instance of the first user interactive application, and
the loading comprises:
terminating the first clone instance; and
switching the second clone instance.

9. The computer-implemented method of claim 1, wherein
the first clone instance is initiated in a simulation system, and
the simulation system simulates a second user interactive application.

10. The computer-implemented method of claim 1, wherein
the first user interactive application interacts with a server,
the first clone instance is initiated in a simulation system, and
the simulation system simulates the server.

11. The computer-implemented method of claim 1, wherein the initiating of the first clone instance comprises:
identifying a property of the first user interactive application;

identifying, based on the identified property, a resource of the first user interactive application, wherein the first user interactive application interacts with the identified resource; and
initiating, in a simulation system, the first clone instance and a simulation of the identified resource.

12. The computer-implemented method of claim 1, wherein the controlling of the display of the result comprises creating an overlay window in the first user interactive application within a vicinity of a location of the trigger.

13. The computer-implemented method of claim 1, further comprising initiating a second clone instance of a second user interactive application, wherein the second clone instance is simultaneously initiated with the initiating of the first clone instance.

14. A system, comprising:
a processor; and
a memory in communication with the processor, the memory containing program instructions that, when executed by the processor, are configured to cause the processor to perform a method, the method comprising:
detecting a launch of a user interactive application;
initiating, based on the detecting of the launch of the user interactive application, a clone instance of the user interactive application;
detecting, after the initiating of the clone instance of user interactive application, a trigger in the user interactive application for a simulation of a user action, wherein the detecting of the trigger is based on hovering of a cursor, for a threshold period of time, on a symbol associated with the user action in the user interactive application;
executing, in the clone instance of the user interactive application, the same user action for which the trigger is detected in the user interactive application, wherein a result of the execution of the user action in the clone instance is same as a result of executing of the user action in the user interactive application; and
controlling display of the result of the execution of the user action to a user of the user interactive application.

15. The system of claim 14, wherein the method performed by the processor further comprises:
monitoring operations of the user interactive application; and
synchronizing, based on the monitoring of the operations, the clone instance and the user interactive application.

16. The system of claim 14, wherein the method performed by the processor further comprises:
recording the execution of the same user action in the clone instance, wherein the display of the result comprises display of the recording.

17. The system of claim 14, wherein the initiating of the clone instance comprises:
identifying a property of the user interactive application;
identifying, based on the identified property, a resource of the user interactive application, wherein the user interactive application interacts with the identified resource; and
initiating, in a simulation system, the clone instance and a simulation of the identified resource.

18. A computer program product, the computer program product comprising a computer readable storage medium having program instructions embodied therewith, the program instructions are executable by a computer to cause the computer to:
detect a launch of a user interactive application;

initiate, based on the detection of the launch of the user interactive application, a clone instance of the user interactive application;

detect, after the initiation of the clone instance of the user interactive application, a trigger in the user interactive application, for a simulation of a user action, wherein the detection of the trigger is based on a hover of a cursor, for a threshold period of time, on a symbol associated with the user action in the user interactive application;

execute, in the clone instance of the user interactive application, the same user action for which the trigger is detected in the user interactive application, wherein a result of the execution of the user action in the clone instance is same as a result of execution of the user action in the user interactive application; and control display of the result of the execution of the user action to a user of the user interactive application.

19. The computer program product of claim 18, wherein the program instructions are further executable by the computer to cause the computer to:

monitor operations of the user interactive application; and synchronize, based on the monitored operations, the clone instance and the user interactive application.

20. The computer program product of claim 18, wherein the program instructions are further executable by the computer to cause the computer to:

record the execution of the same user action in the clone instance, wherein the display of the result comprises display of the record.

* * * * *